(12) United States Patent
Wood, Jr. et al.

(10) Patent No.: US 7,370,904 B2
(45) Date of Patent: May 13, 2008

(54) COVERING DEVICE FOR A VEHICLE CONTAINER

(75) Inventors: Robert A. Wood, Jr., Honolulu, HI (US); Douglas Howell, Montorville, MN (US)

(73) Assignee: McNeilus Truck and Manufacturing, Inc., Dodge Center, MN (US)

( * ) Notice: Subject to any disclaimer, the term of this patent is extended or adjusted under 35 U.S.C. 154(b) by 82 days.

(21) Appl. No.: 11/384,290

(22) Filed: Mar. 21, 2006

(65) Prior Publication Data

US 2007/0222253 A1    Sep. 27, 2007

(51) Int. Cl.
*B60P 7/04*    (2006.01)

(52) U.S. Cl. .................... 296/98; 296/100.14
(58) Field of Classification Search ............... 296/98, 296/100.14
See application file for complete search history.

(56) References Cited

U.S. PATENT DOCUMENTS

| | | | | |
|---|---|---|---|---|
| 3,738,075 A | * | 6/1973 | Nansel | 52/115 |
| 3,921,819 A | * | 11/1975 | Spain | 212/349 |
| 4,050,734 A | * | 9/1977 | Richard | 296/98 |
| 4,341,416 A | | 7/1982 | Richard | 296/98 |
| 4,490,951 A | * | 1/1985 | Mentzer et al. | 52/115 |
| 4,874,196 A | * | 10/1989 | Goldstein et al. | 296/98 |
| 5,180,203 A | | 1/1993 | Goudy | 296/98 |
| 5,238,287 A | * | 8/1993 | Haddad, Jr. | 296/98 |
| 5,292,169 A | | 3/1994 | O'Brian | 296/98 |
| RE36,135 E | * | 3/1999 | O'Brian | 296/98 |
| 6,237,985 B1 | | 5/2001 | O'Brian | 296/98 |
| 6,338,521 B1 | | 1/2002 | Henning | 296/100.15 |
| 6,474,718 B1 | | 11/2002 | Henning | 296/98 |
| 6,578,897 B2 | | 6/2003 | White | 296/98 |
| 6,637,800 B2 | | 10/2003 | Henning | 296/100.15 |
| 6,814,386 B2 | | 11/2004 | Wood, Jr. | 296/98 |
| 6,974,176 B2 | * | 12/2005 | Smith et al. | 296/98 |
| 7,111,574 B2 | * | 9/2006 | Slatter | 114/255 |
| 7,111,891 B2 | * | 9/2006 | O'Brian et al. | 296/98 |
| 2004/0036311 A1 | * | 2/2004 | Wood | 296/98 |
| 2007/0007418 A1 | * | 1/2007 | Lubbers et al. | 248/326 |

OTHER PUBLICATIONS

The L20 Series, Exceptional Performance in a cost-effective package, © 2005 Helac Corporation, 7 pages.

\* cited by examiner

*Primary Examiner*—Dennis H Pedder
(74) *Attorney, Agent, or Firm*—Nikolai & Mersereau, P.A.; C. G. Mersereau (57) ABSTRACT

A cover assembly for a vehicle carried open top container wherein a cover is connected at one end to a vertically adjustable tower and an opposite end to a cross member connected to a pair of pivot arms that are mounted at their lower ends to be pivoted by at least one hydraulic actuator that is mounted to the vehicle intermediate opposite ends of the container and adjacent the bottom thereof. An effective length of each pivot arm may be adjusted and locked in adjusted position.

20 Claims, 11 Drawing Sheets

COVERING DEVICE FOR A VEHICLE CONTAINER

BACKGROUND OF THE INVENTION

1. Field of the Invention

The present invention relates to a covering device used for covering the open top of a vehicle container that is carried by or on trucks, trailers, roll-on/roll-off hoists, and similar vehicles.

2. Brief Description of the Related Art

It is well known in the industry to provide an automated means of covering the open top of a container that is carried on a vehicle such as a truck, trailer, roll-on/roll-off hoist, or similar vehicle. Such covers are particularly useful when transporting loose materials such as garbage, sand, or gravel, to prevent the load from being blown out of the container by the wind. Additionally, the cover protects the load from contamination. Many examples of container covers are known in the prior art. A popular arrangement for covering a truck container is to use a tarpaulin (or 'tarp') or other flexible cover, mounted upon a roller assembly adjacent one end of the truck container. The tarp is pulled from one end of the truck to the other by means of a front-to-rear pivot arm assembly.

There are many variations of pivot arm style covering assemblies that pull a flexible cover over the top of an open top container mounted to or carried on a truck chassis. Typically the pivot arms are powered between a first and second position on the truck by a spring force or hydraulic cylinders coupled directly to the pivot arms or in a rack-and-pinion arrangement in the vicinity of the pivot point. The pivot arms may be fixed in length or variable in length by way of a telescoping feature or other means. There is a cross-member or cover support element joining the outer ends of the pivot arms and attached to one end of the flexible cover. As the pivot arms move from the first position to the second position, the flexible cover is drawn over the opening of the container to cover it. As the pivot arms move from the second position to the first position, the flexible cover is retracted from the container, exposing the open top of the container. U.S. Pat. No. 5,829,818 introduces a device of this configuration having a hydraulic rack-and-pinion assembly at the pivot point to drive the pivot arms between first and second positions.

Another well known feature of automatic covering devices is telescopic pivot arms to cover varying length and height containers. One such device is disclosed in U.S. Pat. No. 4,874,196. This patent discloses a device that utilizes telescoping arms operated by hydraulic pistons inside the arms to extend and retract the length of the arms to ensure that the cover is pulled along the length of the container close to the upper edge of the container opening. U.S. Pat. No. 5,829,818 incorporates a rack-and-pinion device at the pivot point, together with telescopic arms having a piston rod and cylinder incorporated into each pivot arm for adjusting the covering device to accommodate varying size containers.

There are many disadvantages of dual telescoping pivot arms having hydraulic cylinders inside. First the pivot arms are very heavy from the weight of hydraulic hoses, fittings and cylinders inside the arms. This puts undue stress and fatigue on the components of the arms to counter the weight of the arms, especially when the arms are fully extended, thereby putting weight further out on the moment arm. Second, the pivot arms of automatic covering devices for trucks and trailers are very susceptible to damage. It is not unusual for the arms to be hit and bent during the loading process if the container is on the vehicle, or for the container to hit the arms when it is being loaded onto the chassis of a roll-on/roll-off container vehicle. When an arm is bent, the components inside the arms are normally bent or damaged in some way as well. This is very costly and can create a situation where the vehicle cannot be used until an arm repair is made.

Another problem with hydraulic lines and cylinders inside the arms is the fact that even when not damaged, hydraulic lines and components often leak hydraulic fluid which will fall to the ground creating an environmental problem and a nuisance to the public who may find hydraulic fluid on streets, driveways and sidewalks in their neighborhood.

These automatic vehicle covering devices most often have variable height towers in front of the container to support the front edge of the flexible cover. With hydraulic controls to operate the length of the pivot arms, the height of the variable height tower, and the pivot of the arms between the first and second positions, it becomes more complicated for the operator of the vehicle to operate the covering systems.

What is needed is a device for covering the opening of a vehicle container that is simple for the operator to use, can be repaired quickly when damaged and with less cost, and is environmentally friendly.

SUMMARY OF THE INVENTION

An assembly for covering and uncovering the open top of a container transported by a vehicle is mounted to the frame of the vehicle. The container transported by the vehicle has a first and second end. The covering assembly is provided with a retractable cover configured to overlay the opening of the container. A pair of pivot arms, each having an upper and a lower end, pivot about the lower end at a point intermediate the two ends of the container and adjacent the bottom of the container. The pivot arms pivot between first positions in which the upper ends of the pivot arms are adjacent the first end of the container and a second position in which the upper ends are adjacent a second end of the container. The pivot arms have upper and lower sections that are reciprocal relative to one another such that a distance between the upper and lower ends of the pivot arms is variable. A cross member extends between the upper ends of the pivot arms so that the pivot arms are connected together. One end of the retractable cover is attached to the cross member.

A variable height assembly is mounted to the vehicle adjacent the first end of the container to which another end of the retractable cover is attached. When the variable height assembly is raised and lowered while the pivot arms are in the first position, the distance between the upper and lower ends of the pivot arms is increased and decreased, respectively.

A holding or locking device maintains the desired distance between the upper and lower ends of the pivot arms when the pivot arms move between the first and second positions. When the pivot arms are in the first position, the holding device is released to allow a variation of distance between the upper and lower ends thereof.

A hydraulic actuator is mounted to the vehicle adjacent the lower end of the pivot arms that uses hydraulic pressure to move and hold the pivot arms between the first and second positions. When the pivot arms are in the first position and the variable height assembly is raised and lowered, hydraulic pressure is released to allow the pivot arms to pivot freely.

BRIEF DESCRIPTION OF THE DRAWINGS

A better understanding of the invention will be had with reference to the accompanying drawings.

DETAILED DESCRIPTION OF THE INVENTION

For purposes of promoting an understanding of the principles of the invention, reference will be made to the embodiments illustrated in the drawings and specific language will be used to describe the same. It will nevertheless be understood that no limitation of the scope of the invention is thereby intended. The invention includes any alterations and further modifications of the illustrated devices and described methods and further applications of the principles of the invention which would normally occur to one skilled in the art to which the invention relates and equivalents thereof.

Figure 1:
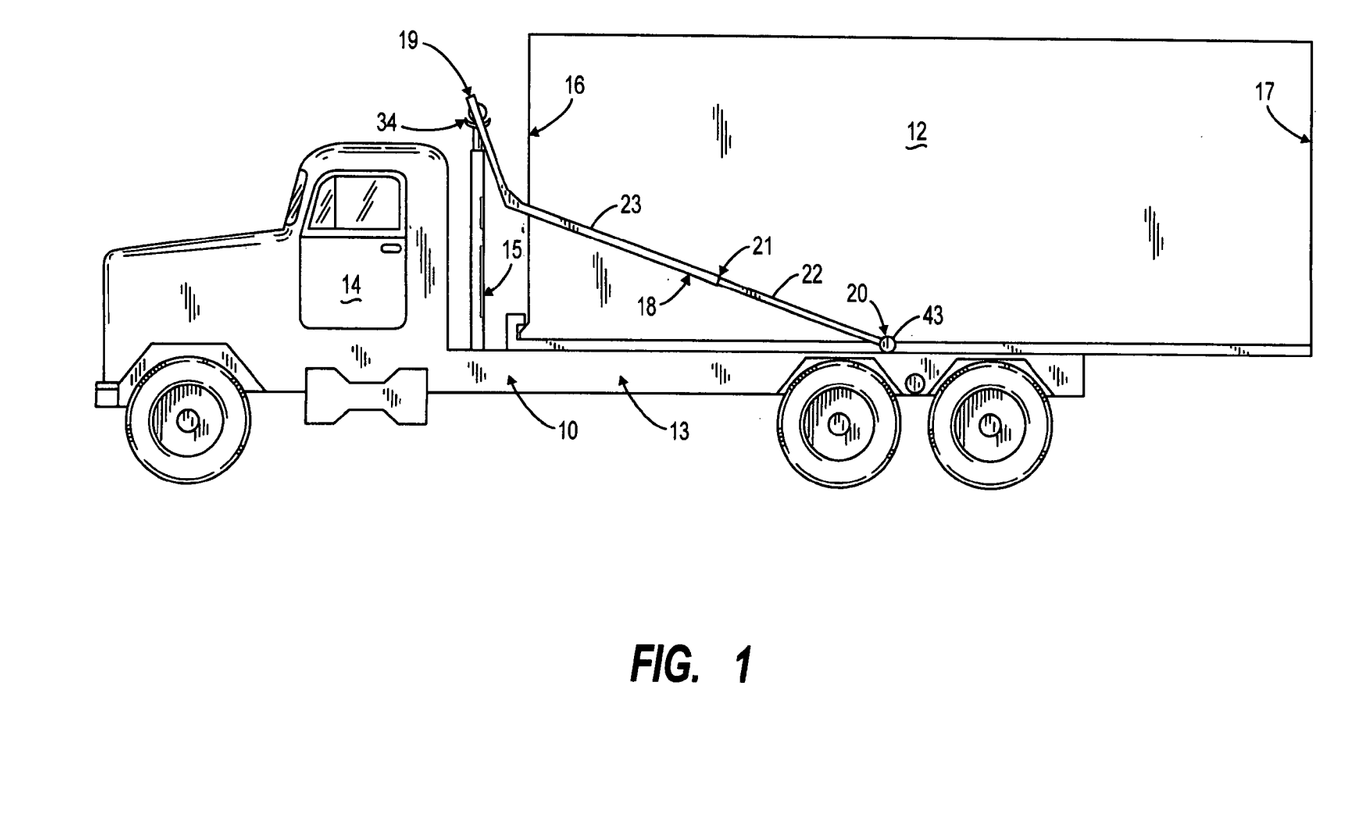
FIG. 1 is a side view of a truck having a container mounted on a bed of the truck and which shows a covering device constructed in accordance with the invention and having pivot arms in a first position and the variable height tower in a completely down position.
Figure 5:
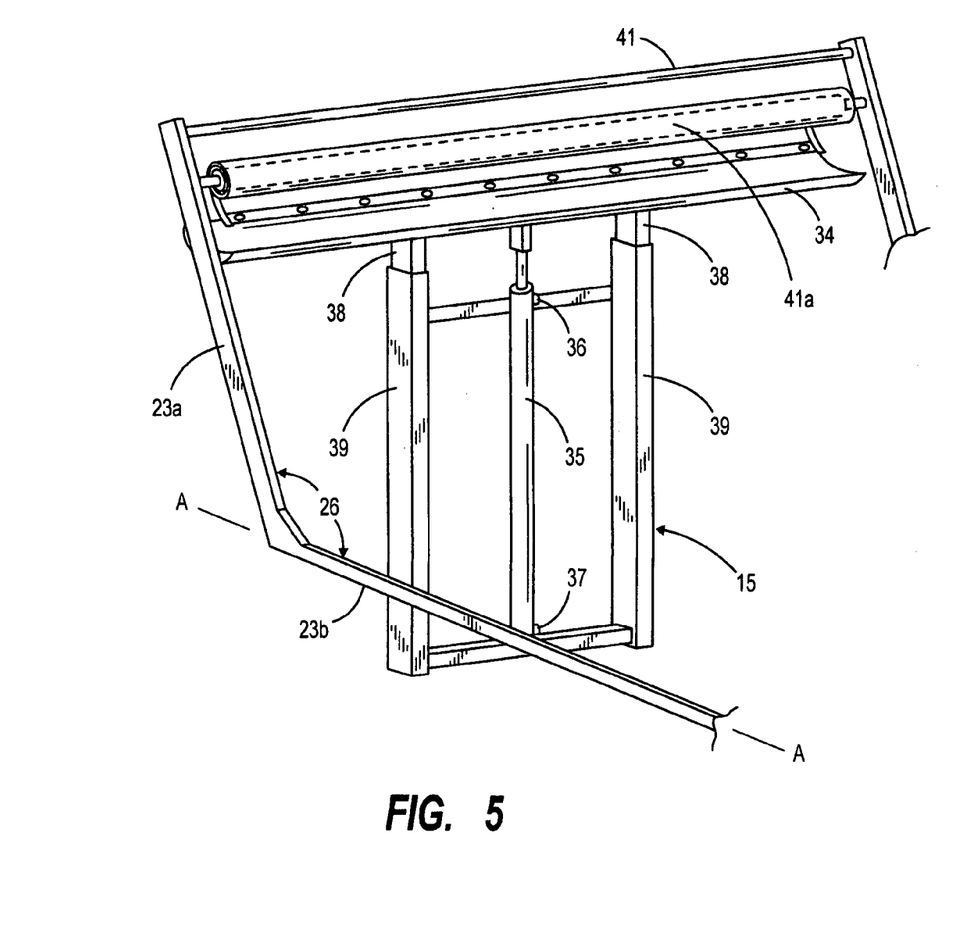
FIG. 5 is a perspective view of the variable height tower as viewed from the rear of the truck.

Referring to the figures, FIG. 1 shows a truck or vehicle 10 carrying a container 12 on a horizontal bed 13. In the front of the truck is a cab 14. Container 12 has a first end 16 toward the front of the truck and a second end 17 at the rear of the truck. A variable position tower 15 is mounted behind the cab 14 and in front of the first end 16 of the container 12. Pivot arms 18 are mounted on opposite sides of the truck so as to be located on opposite sides of the container. Each pivot arm has an upper end 19 and is pivotally mounted at a lower end 20 to drive mechanism as will be described more fully hereinafter. Each pivot arm is made up of a lower pivot arm section 22 and an upper pivot arm section 23. The upper ends of the pivot arms are connected by a cross member 41. In some embodiments, and as shown in FIG. 5, the cross member may include a spring loaded roller assembly 41a that automatically winds the cover thereon as the pivot arms are moved from their second deployed position, as shown in dotted line in FIG. 2, to their first position adjacent the front of the container as shown in FIG. 1. In some embodiments, the cross member may be a solid rod which supports the cover as the cover is taken up by a spring roller mounted on the variable height tower when the pivot arms are being pivoted from their deployed position to their first position.

In the preferred embodiment, the upper pivot arm sections include upper and lower segments 23a and 23b, respectively, wherein the upper segments are inclined at an upward angle relative to an elongated axis A-A of the lower segments, see FIG. 5. As shown, an angle 26 between the segments is approximately 45 degrees. In other embodiments, the upper sections 23 of each of the pivot arms 18 may be substantially straight so as to be aligned with the axis A-A of the adjacent lower segment.

Figure 2:
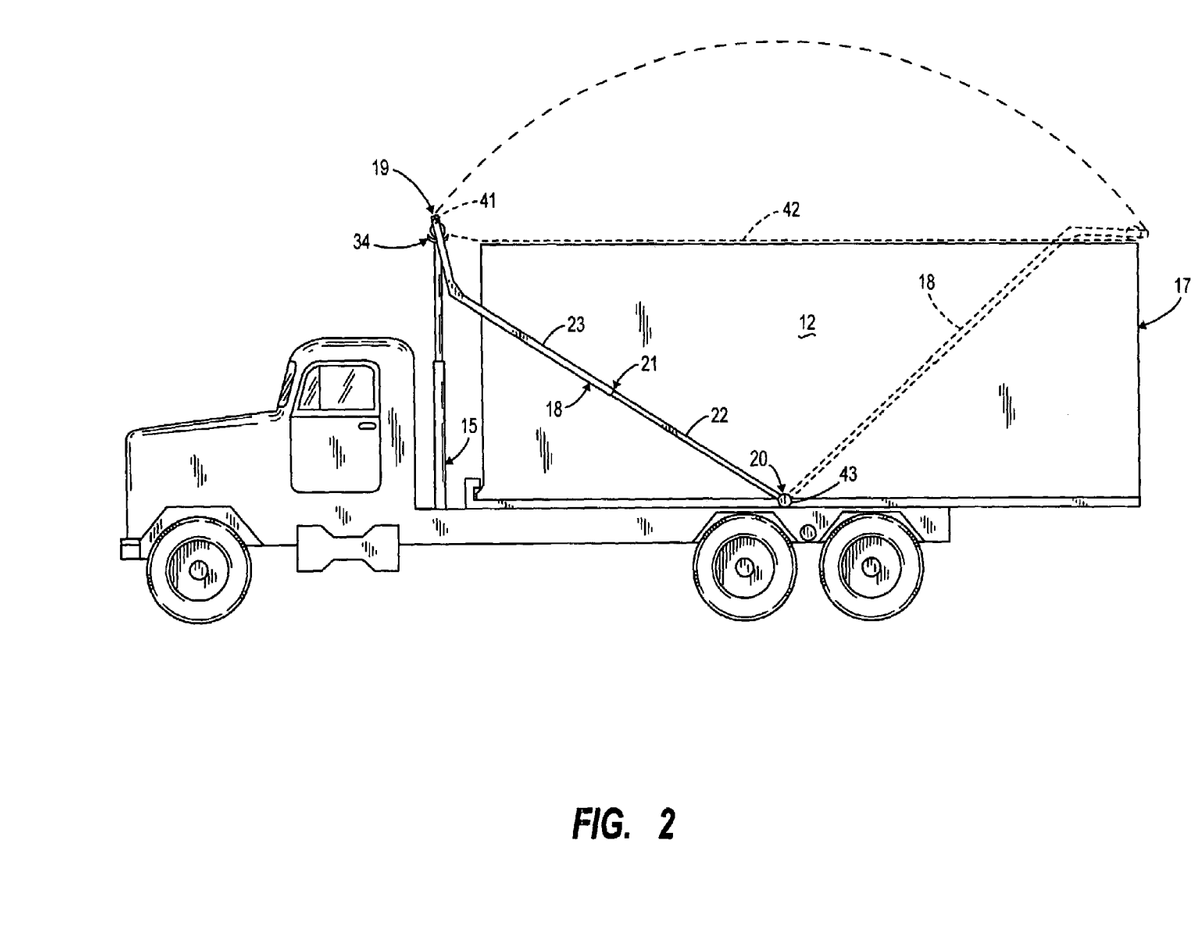
FIG. 2 is a view similar to FIG. 1, but having the variable height tower in a fully raised position. The dotted arcuate line shows the arc of the pivot arms as they pivot from the first position to the second position. Dotted lines also represent the pivot arms in the second position and the flexible cover overlaying the open top of the container when the pivot arms are in the second position.

In the embodiment shown in FIGS. 1 and 2, the lower pivot arm sections 22 telescope inside of the lower segments 23b of the upper pivot arm sections 23 when the pivot arms 18 are in their first positions with their upper ends 19 resting on roller tray 34 of the variable height tower 15, as the variable height tower 15 is raised and lowered. A holding or locking mechanism 40 is mounted to each of the upper ends of the lower pivot arm sections 22. The holding mechanisms are selectively activated to secure the upper and lower pivot arm section to one another.

Figure 4:
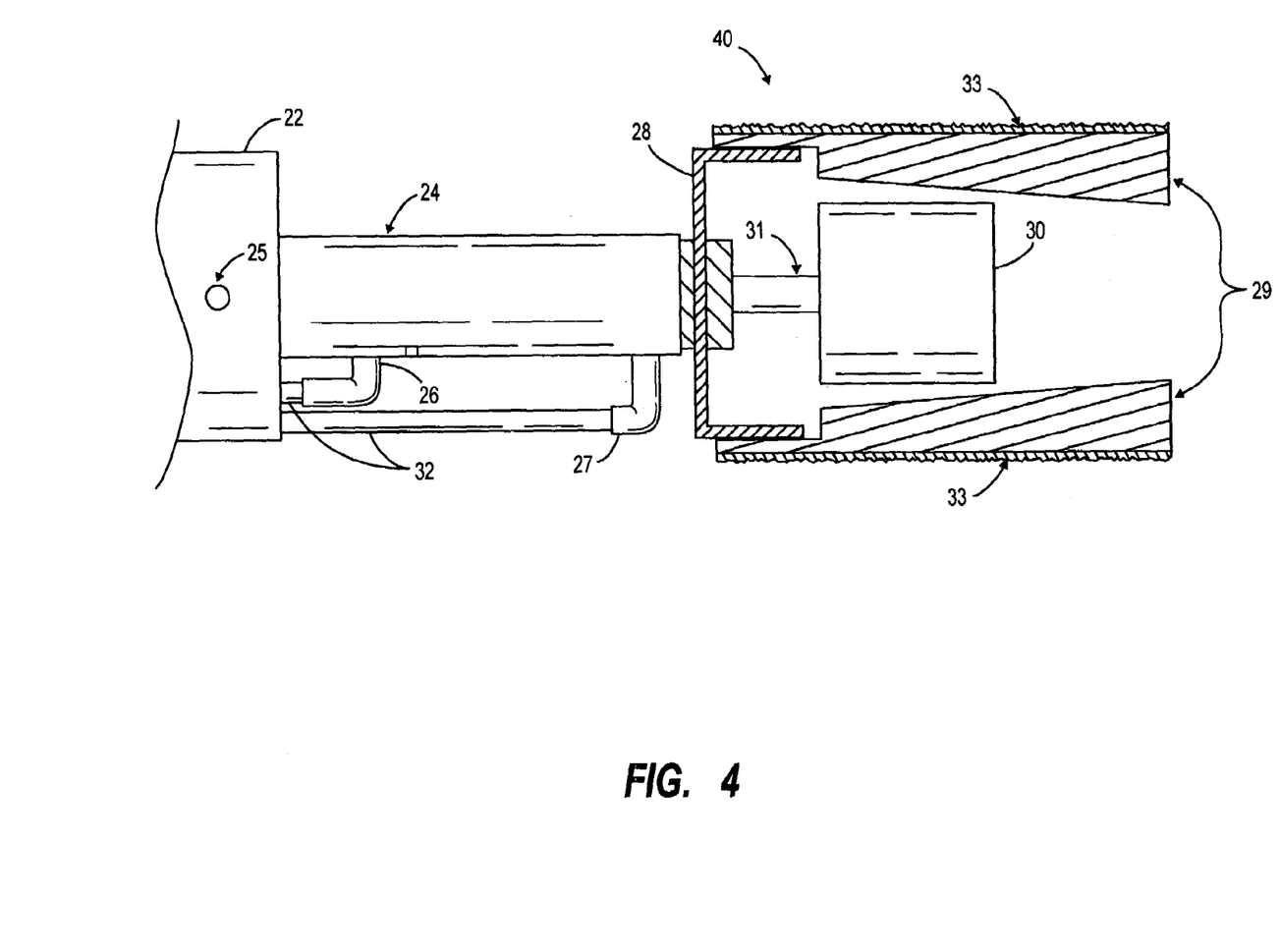
FIG. 4 is a side view of a telescopic holding member of the preferred embodiment of the invention in a released or unlocked position.

The holding member 40 of the preferred embodiment is shown in FIG. 4 and includes an air or pneumatic cylinder 24 attached to the upper end of the lower pivot arm section 22 at point 25. Air line 32 is routed inside of lower pivot arm section 22 and is connected to upper and lower ports 26 and 27, respectively. As air pressure is directed to lower port 26 and exhausted from upper port 27, cylinder rod 31 extends and forces a block 30 against opposing wedge shaped brake pads having textured surfaces 33. The brake pads then come in contact with an inner surface of the upper pivot arm sections 23 to hold the upper and lower pivot arms sections 23 and 22 together. When air pressure is redirected through air lines 32 to upper port 27 and exhausted from port 26, cylinder rod 31 retracts into cylinder 24 thereby releasing the pressure of the brake pads against the inside of upper arm sections 23. As opposed to a pneumatic cylinder, a hydraulic cylinder and fluid circuit may be used to control the holding member.

The variable height tower 15 is raised and lowered, in the preferred embodiment, by a pneumatic cylinder 35 shown in FIG. 5. As air pressure is directed to the lower port 37 and exhausted from the upper port 36, the inner legs 38 telescope inside of the outer legs 39 raising the roller tray 34 to an elevated position at or above the height of the first end 16 of container 12, as shown in FIG. 2. By directing air pressure into the upper port 36 and exhausting air out of the lower port 37, the variable height tower is lowered to a position wherein the roller tray 34 is at or below the height of the first end 16 of the container 12, as shown in FIG. 1.

Figure 3:
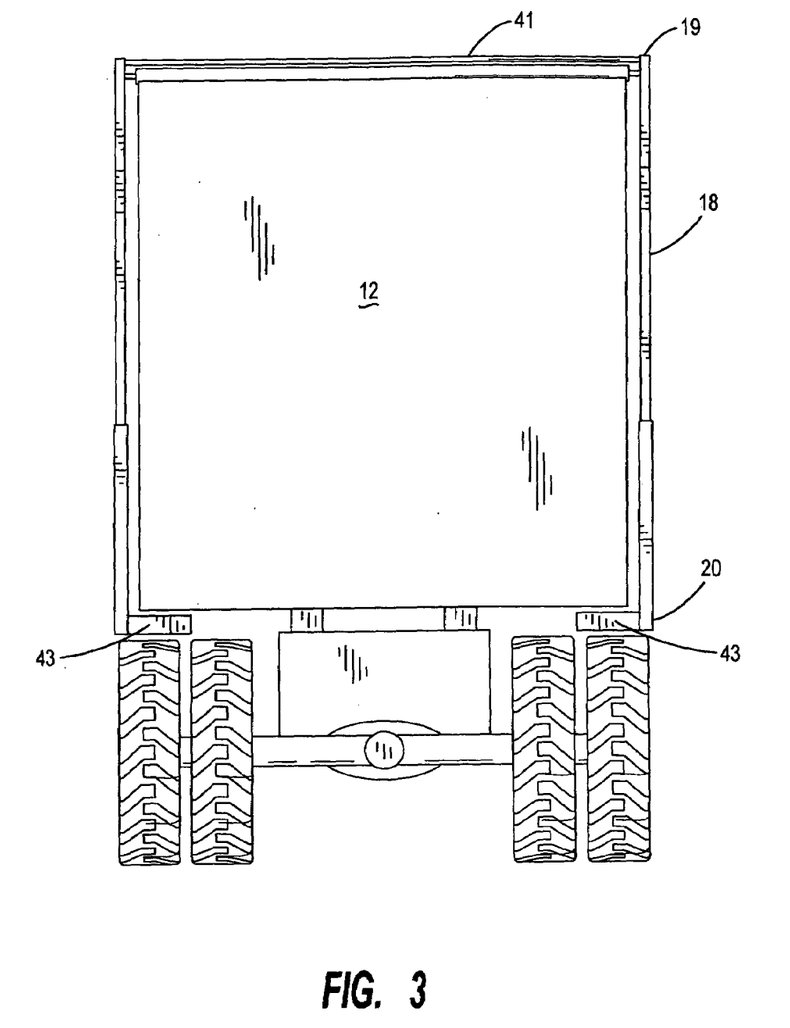
FIG. 3 is a rear view of the truck having the container mounted thereon as shown in FIGS. 1 and 2 and which shows a covering device constructed in accordance with the invention and having the pivot arms in the second position.

In the preferred embodiment, the pivot arms 18 pivot at the lower ends 20 by being rotated by a pair of hydraulic rotary actuators 43 mounted to the frame or chassis of vehicle 10 and on opposite sides thereof. The rotary actuators 43 are identical to each other and operate independently of each other. That is, there is no rotating shaft or mechanical linkage between the rotary actuators other than the pivot arms 18 connected by the cross member 41. The lower ends 20 of the pivot arms 18 are attached directly to the rotating faces 71 of the rotary actuators 43. Some or all of each rotary actuator 43 is mounted outside a lateral width of container 12, as shown in FIG. 3. Preferred hydraulic rotary actuators include the L20 series actuators manufactured by Helac Corporation of Enumclaw, Wash., USA. The lower ends of the pivot arms are bolted to the rotary faces of the actuators. In some embodiments, only a single actuator may be provided to which only the lower end of one of the pivot arms will be secured.

Figure 12:
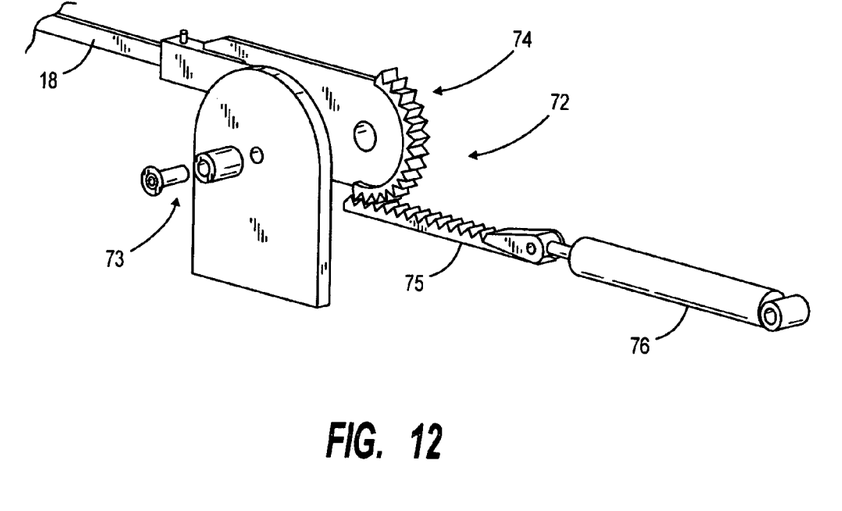
FIG. 12 is a rack and pinion style hydraulic actuator of an alternative embodiment, at the pivot point of the pivot arms.

In some embodiments, as opposed to using rotary actuators, one or more rack and pinion hydraulic actuators 72, as shown in FIG. 12, may be used to control movement of the pivot arms. Such rack and pinion actuators may be similar to those supplied by Pioneer Cover-all of N. Oxford, Mass., USA and include a pivot shaft 73 about which a pivotal crank 74 pivots when a rack 75 is moved linearly by a piston device 76. The pivot arms are connected to the cranks 74.

Figure 13:
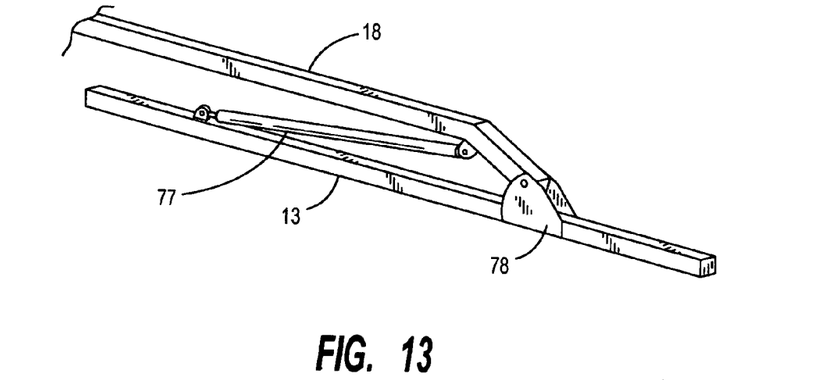
FIG. 13 is a hydraulic actuator of an alternative embodiment in which a hydraulic cylinder is connected between the pivot arm and vehicle frame.

In yet further embodiments of the invention, although not preferred, at least one hydraulic cylinder 77 may be connected between the vehicle, that is, truck frame or chassis, and at least one of the pivot arms 18 as shown in FIG. 13, using direct and/or indirect linkages, in order to pivot the pivot arms between their first and second positions about pivot bracket 78.

Figure 6:
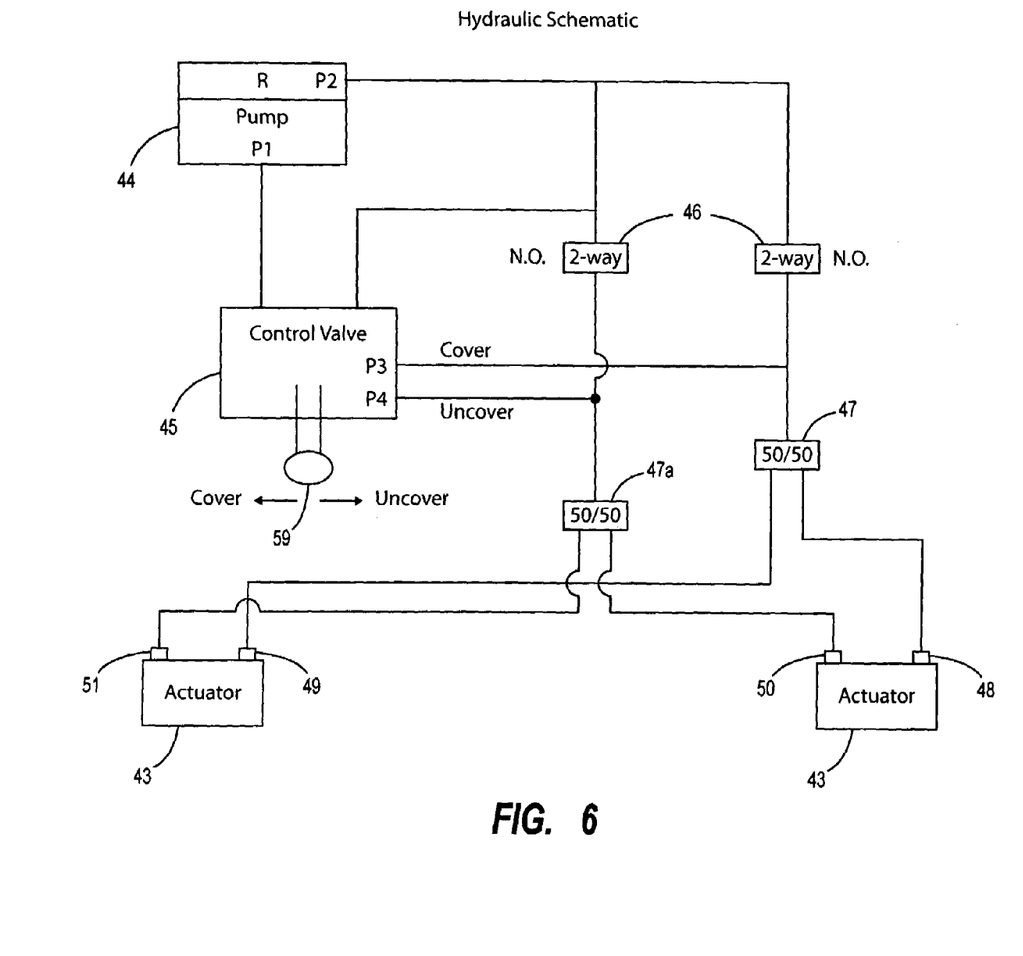
FIG. 6 is a schematic diagram of a hydraulic circuit for controlling the covering device in accordance with the invention.

FIG. 6 is a schematic diagram of a hydraulic circuit for controlling the covering device of the preferred embodiment. Hydraulic pump 44 is a self-contained electric over hydraulic pump operated on 12 or 24 volts DC power to a pressure of at least 3000 psi. The pressure port P1 of pump 44 is connected to a control valve 45. The control valve 45 is a lever operated three position, spring to center closed position valve. In the neutral or closed position, hydraulic fluid is directed back to a hydraulic reservoir R through port P2. The two operative positions of lever 59 of control valve 45 are COVER and UNCOVER. The COVER position directs hydraulic flow and pressure through port P3 to a 50/50 flow divider/converter 47 to the outer port 48 of rotary actuator 43 and the inner port 49 of the opposite rotary actuator 43. The UNCOVER position directs hydraulic flow and pressure through port P4 to a separate 50/50 flow divider/converter 47a to the two remaining ports 50 and 51 of the opposing rotary actuators. Two, normally open, electric solenoid operated two-way hydraulic valves 46 are installed in line between pressure ports P3 and P4 of control valve 45 and the hydraulic reservoir R, as shown.

Figure 7:
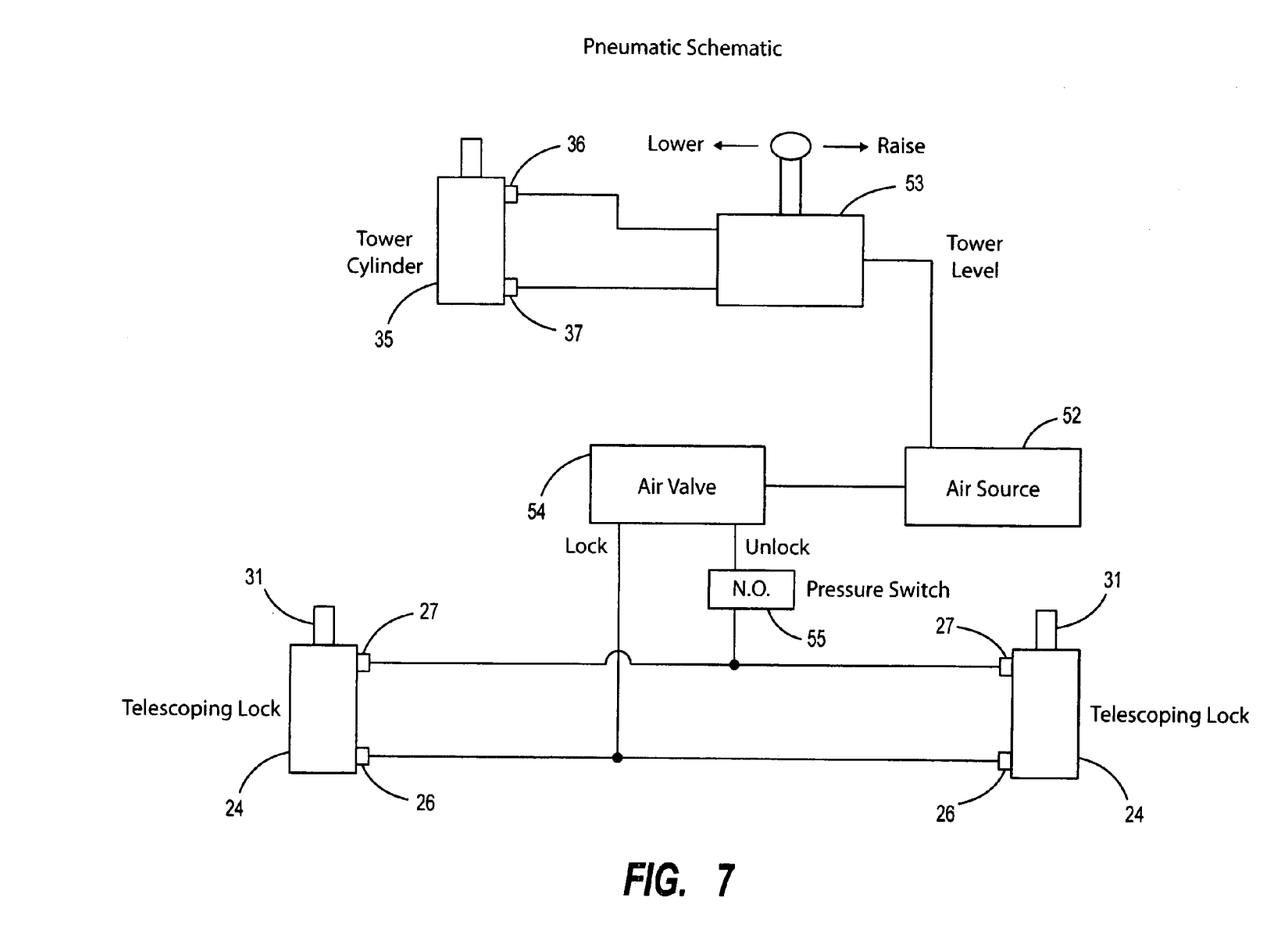
FIG. 7 is a schematic diagram of a pneumatic circuit for controlling the covering device in accordance with the invention.

FIG. 7 is a schematic diagram of a pneumatic circuit for controlling the covering device of the preferred embodiment. Air source 52 is provided by the on-board truck 10 air supply. Air source 52 feeds air pressure to variable height tower control valve 53 and telescoping arm lock/unlock control valve 54. Control valve 53 is a lever operated three position, spring to center closed position valve. The two operative lever positions of control valve 53 are RAISE and LOWER. The RAISE position directs air pressure to lower port 37 of air cylinder 35 and exhausts air out of upper port 36. The LOWER position directs air pressure to the upper port 36 and exhausts air out of the lower port 37. Control valve 54 is an electric solenoid operated three-way, two position valve. The two positions are LOCK and UNLOCK. The LOCK position directs air pressure to the lower ports 26 of the air cylinders 24 and exhausts air out of the upper ports 27. The UNLOCK position directs air pressure to the upper ports 28 of the air cylinders 24 and exhausts air out of the lower ports 26. An electrical normally open pressure switch 55 is connected in-line on the unlock circuit, as shown in FIG. 7.

Figure 8:
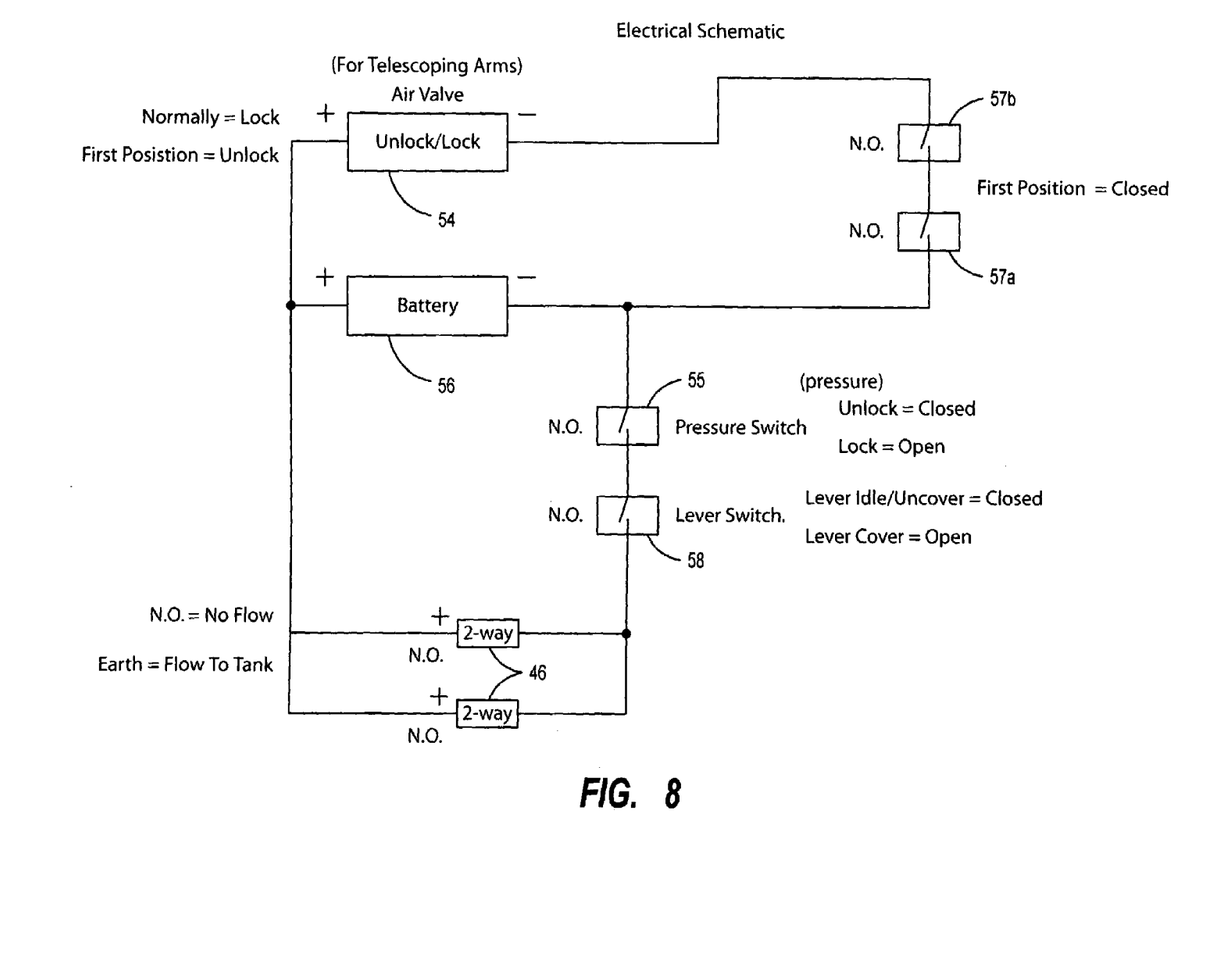
FIG. 8 is a schematic diagram of an electric circuit for controlling the covering device in accordance with the invention.

FIG. 8 is a schematic diagram of the electrical circuit for controlling the covering device of the preferred embodiment. The electric source is provided by a 12 volt or 24 volt onboard truck battery 56. The positive terminal of battery 56 is electrically connected to the electric solenoid of air valve 54 and the normally open electric solenoids of two-way hydraulic valves 46. The negative terminal of the battery 56 is electrically connected to one electrical terminal of normally open pressure switch 55 and to one terminal of normally open electrical switch 57a. Another normally open electrical switch 57b is wired in series between switch 57a and electric solenoid of air valve 54, as shown in FIG. 8. A normally closed electrical switch 58, which is switched open or closed by the position of lever 59 on hydraulic control valve 45, is wired in series between pressure switch 55 and normally open electric solenoids of the two-way hydraulic valves 46. Electric switch 58 is closed when the lever 59 is in the neutral or UNCOVER positions. Electrical switch 58 is open when lever 59 is in the COVER position.

The operation of the covering device of the preferred embodiment is automated through the cooperation of hydraulic, pneumatic, and electrical components and circuitry described in FIG. 6, FIG. 7, and FIG. 8. Switches 57a and 57b are mounted on opposing ends of roller tray 34 and switched to the closed position when the upper ends 19 of the pivot arms 18 are in their first position. In this configuration shown in FIG. 1 and by the solid lines of FIG. 2, holding members 40 are unlocked and rotary actuators 43 are depressurized and open to tank, allowing the pivot arms to rotate slightly at their lower ends 20 and allowing upper arm sections 23 to telescope over lower arm sections 22 as the variable height tower is raised and lowered.

To deploy the flexible cover 42 over the open top of the container, the variable height tower 15 is positioned so that the roller tray 34 is at or above the height of the first end 16 of the container 12. The lever 59 is moved to the COVER position which opens switch 58 thereby closing off flow through the hydraulic valves 46 and allowing rotary actuators 43 to rotate the pivot arms 18 at their lower ends 20 from the first position to the fully covered or deployed second position. As the upper ends 19 of the pivot arms 18 are lifted out of roller tray 34, electric switches 57a and 57b are switched open causing air valve 54 to lock holding members 40 and thereby prevent the pivot arms 18 from telescoping as the pivot arms rotate to the second position. As the pivot arms move from the first to second positions, the flexible cover 42, attached at the back end to cross member 41 and front end to roller tray 34, is deployed across the open top of container 12.

To retract the flexible cover 42, variable height tower is raised to the same position as when it was deployed. The lever 59 is moved to the UNCOVER position. As the upper ends 19 of the pivot arms 18 come into contact with the roller tray 34, the electric switches 57A and 57B are switched closed causing the air valve 54 to unlock the holding member 40. The unlocking of holding member 40 directs pressure to pressure switch 55 thereby closing the electrical circuit of the hydraulic valves 46 and opening hydraulic flow from the rotary actuators 43 to the hydraulic reservoir or tank. This again allows the pivot arms 18 to rotate slightly and telescope freely as the variable height tower is lowered and stowed.

Figure 9:
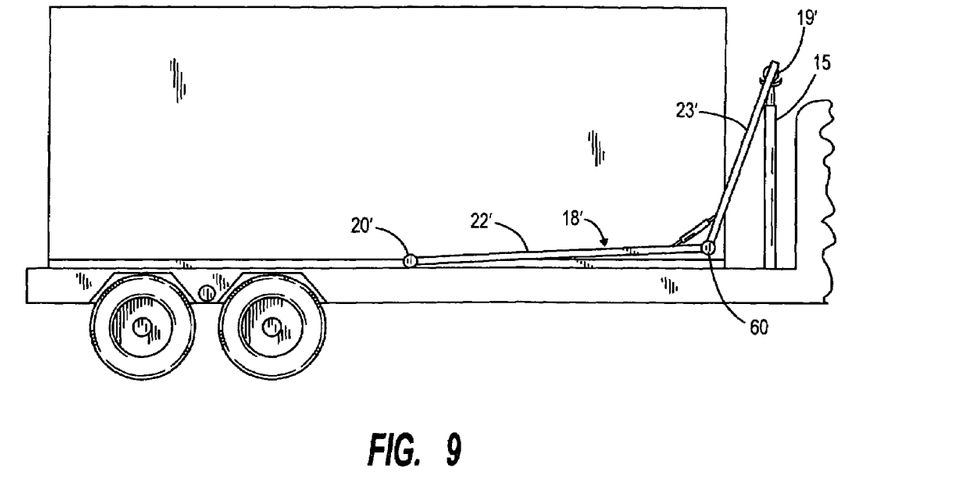
FIG. 9 is a view similar to FIG. 1 but showing an alternative embodiment of a covering device.
Figure 10:
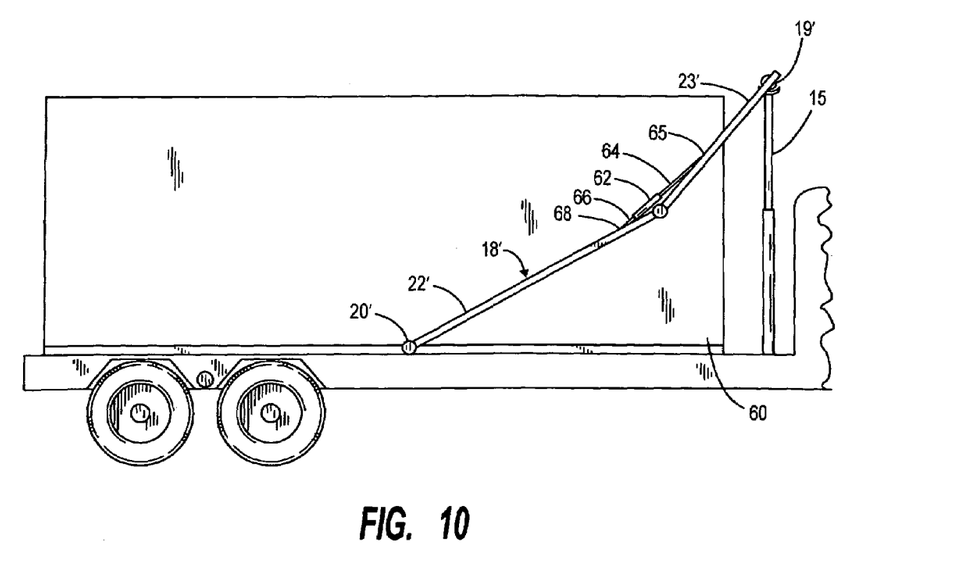
FIG. 10 is a similar view of the alternative embodiment of FIG. 9 but having the variable height tower in the fully raised position.
Figure 11:
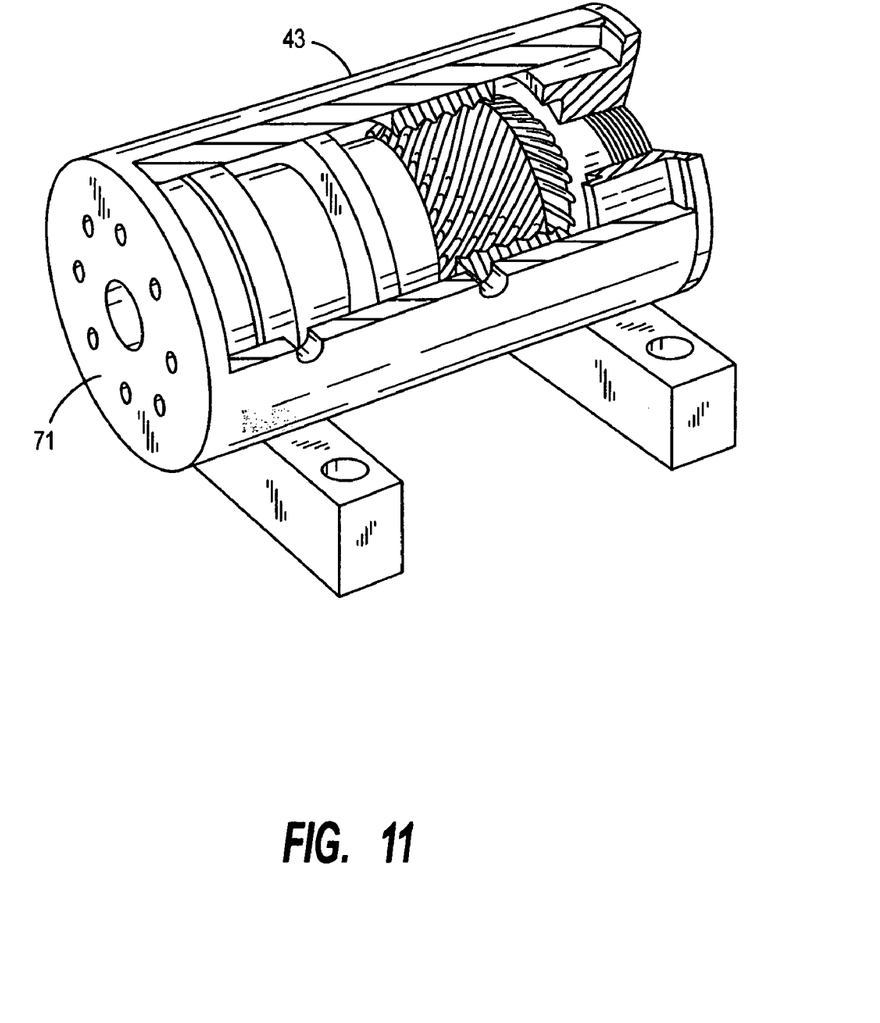
FIG. 11 is a hydraulic rotary actuator of the preferred embodiment having a cross section cut away, and showing the internal elements of the actuator.

In an alternative embodiment shown in FIG. 9 and FIG. 10, the lower pivot arm section 22' is connected with upper pivot arm section 23' at a hinge point 60. In this alternative embodiment, the variable distance between the upper ends 19' and the lower ends 20' of the pivot arms 18' is gained through variable angles between the lower and the upper pivot arms sections 22' and 23' at hinge point 60. The hydraulic, pneumatic and electrical circuitry described previously will be the same or very similar for this and other alternative embodiments that vary the distance between the upper ends 19' and the lower ends 20' of the pivot arms 18', as the variable height tower 15 is raised and lowered.

In this alternate embodiment, the upper and lower sections of the pivot arms 18' may be selectively locked in an adjusted position using a hydraulic or pneumatic cylinder 62 having a reciprocal rod 64 pivotally connected to the upper section 23' at 65. An opposite end of the cylinder is connected by fixed rod 66 to a pivot point 68 on the lower section 22'. Preferably, the cylinder is mounted along a side portion of the sections 22' and 23' such that the sections may be manipulated to a straight of in-line configuration by operation of the cylinder. Fluid flow to the cylinder 62 will be generally the same as described with respect to the previous embodiment.

We claim:

1. A cover assembly mounted to the frame of a vehicle for covering an open top container mounted on the vehicle and having first and second ends, the cover assembly comprising; a retractable cover configured to overlay the open top of the container, a pair of pivot arms, each pivot arm having an upper and lower end, each pivot arm being pivotal at their lower end at a point intermediate the first and second ends of the container and adjacent a bottom of the container between a first position in which the upper ends of pivot arms are adjacent the first end of the container and a second position in which the upper ends are adjacent the second end of the container, means for varying a distance between the upper and lower ends of the pivot arms, a cross member extending between the upper ends of the pivot arms so that the pivot arms are connected together and to which one end of the retractable cover is attached, said means for varying a distance including a variable height assembly to which another end of the retractable cover is attached, the variable height assembly being mounted to the vehicle adjacent the first end of the container in a position such that when raised and lowered and while the pivot arms are in their first position, will increase and decrease the distance between the upper and lower ends of the pivot arms, means for raising and lowering the variable height assembly, means for maintaining a desired distance between the upper and lower ends of the pivot arms when the pivot arms are moved from the first position but for permitting the increase and decrease of distance between the upper and the lower ends of the pivot arms when the pivot arms are in their first position engaging the variable height assembly, the lower end of at least one of the pivot arms being connected to a hydraulic actuator mounted to the vehicle, the hydraulic actuator including spaced first and second ports, and means for supplying hydraulic pressure from a hydraulic reservoir relative to the first and second ports to operate the at least one hydraulic actuator to move the pivot arms between the first and second positions and that automatically releases hydraulic pressure from both ports of the at least one hydraulic actuator, simultaneously, to allow the pivot arms to pivot freely in either direction while the pivot arms are in their first position and the variable height assembly is raised and lowered.

2. The cover assembly of claim 1 wherein the lower ends of both pivot arms are connected to hydraulic actuators mounted on opposite sides of the vehicle.

3. The cover assembly of claim 2 wherein the means for varying a distance between the upper and lower ends of the pivot arms includes forming each pivot arm with telescoping upper and lower sections.

4. The cover assembly as claimed in claim 3 wherein the upper section of each pivot arm includes an upper segment that is upwardly inclined at an angle with respect to an elongated axis of a lower segment.

5. The cover assembly of claim 2 wherein the means for varying a distance between the upper and lower ends of the pivot arms includes each pivot arm including an upper section and a lower section and means for pivotally connecting the upper and lower sections to thereby vary an angle between the upper and lower sections.

6. The cover assembly of claim 2 wherein the means for raising and lowering the variable height assembly includes a pneumatic cylinder.

7. The cover assembly of claim 2 wherein the means for raising and lowering the variable height assembly includes a fluid operated extendable cylinder member.

8. The cover assembly of claim 2 wherein the cross member includes a spring loaded roller assembly.

9. The cover assembly of claim 2 wherein the cross member includes a rigid bar.

10. The cover assembly of claim 3 wherein the means for maintaining includes means for locking the upper and lower sections of each pivot arm such that they can not be extendable relative to one another.

11. The cover assembly of claim 10 wherein the means for locking is a fluid operated extendable cylinder locking device.

12. The cover assembly of claim 10 wherein the means for locking includes selectively movable brake elements carried by one of the upper and lower sections for engaging the other of the upper and lower sections.

13. The cover assembly of claim 2 wherein the hydraulic actuators are hydraulic rotary actuators.

14. The cover assembly of claim 13 wherein the hydraulic rotary actuators are mounted to the vehicle on opposite sides thereof.

15. The cover assembly of claim 14 in which at least a portion of each rotary actuator extends outside a lateral width of the container.

16. The cover assembly of claim 14 wherein the lower ends of the pivot arms are mounted directly to the rotary actuators.

17. The cover assembly of claim 14 wherein the rotary actuators operate simultaneously with one another.

18. The cover assembly of claim 17 in which the rotary actuators are identical to each other.

19. The cover assembly of claim 2 wherein the hydraulic actuators are hydraulic rack-and-pinion assemblies.

20. The cover assembly of claim 2 wherein the hydraulic actuators include at least one hydraulic cylinder connected between the pivot arms and the vehicle.

* * * * *